(12) United States Patent
Gill et al.

(10) Patent No.: US 9,770,966 B1
(45) Date of Patent: Sep. 26, 2017

(54) IMPACT RESISTANT COVER FOR A VEHICLE

(71) Applicants: Sam Gill, Rockwall, TX (US); Joyce Gill, Rockwall, TX (US)

(72) Inventors: Sam Gill, Rockwall, TX (US); Joyce Gill, Rockwall, TX (US)

( * ) Notice: Subject to any disclaimer, the term of this patent is extended or adjusted under 35 U.S.C. 154(b) by 0 days.

(21) Appl. No.: 14/462,826

(22) Filed: Aug. 19, 2014

(51) Int. Cl.
*B60J 11/04* (2006.01)

(52) U.S. Cl.
CPC ..................................... *B60J 11/04* (2013.01)

(58) Field of Classification Search
USPC ............. 280/762, 770; 296/95.1, 98, 136.01, 296/136.02; 150/166, 167, 168
See application file for complete search history.

(56) References Cited

U.S. PATENT DOCUMENTS

| | | | |
|---|---|---|---|
| 5,167,267 A * | 12/1992 | McQuaid | 150/166 |
| 5,244,246 A * | 9/1993 | Cunningham | 296/136.11 |
| 5,476,127 A * | 12/1995 | Fournier | 150/166 |
| 5,800,006 A * | 9/1998 | Pettigrew | 296/136.02 |
| 6,070,629 A | 6/2000 | Whiteside | |
| 6,220,648 B1 | 4/2001 | Daniel | |
| 6,415,832 B1 | 7/2002 | Ricks | |
| 7,036,867 B1 * | 5/2006 | Yang | 296/136.07 |
| 8,465,053 B2 * | 6/2013 | King, IV | 280/770 |
| 2006/0061132 A1 * | 3/2006 | Sua-an | 296/136.01 |
| 2006/0103165 A1 * | 5/2006 | Ward | 296/136.02 |

* cited by examiner

*Primary Examiner* — John Walters

(57) ABSTRACT

An impact resistant cover for a vehicle including a set of top pads, a set of left pads and right pads, a front pad, and a rear pad. Each pad includes a waterproof outer layer, an impact resistant middle layer, a soft bottom layer, and hook and loop fasteners. Each left, right, front and read pad includes a strap with a hook. The pads removably attach to each other to form the cover. The strap and hook secure the cover to the vehicle. The impact resistant middle layer absorbs the force delivered by the hail. The soft bottom layer prevents damage to the vehicle by the cover. The cover is modular so that any number of pads may be used to accommodate vehicles of different sizes and shapes. The impact resistant middle layer can be composed of polystyrene foam, fiberboard, air bubble plastic, or an inflatable rubber bladder.

6 Claims, 4 Drawing Sheets

IMPACT RESISTANT COVER FOR A VEHICLE

BACKGROUND OF THE INVENTION

Figure 1:
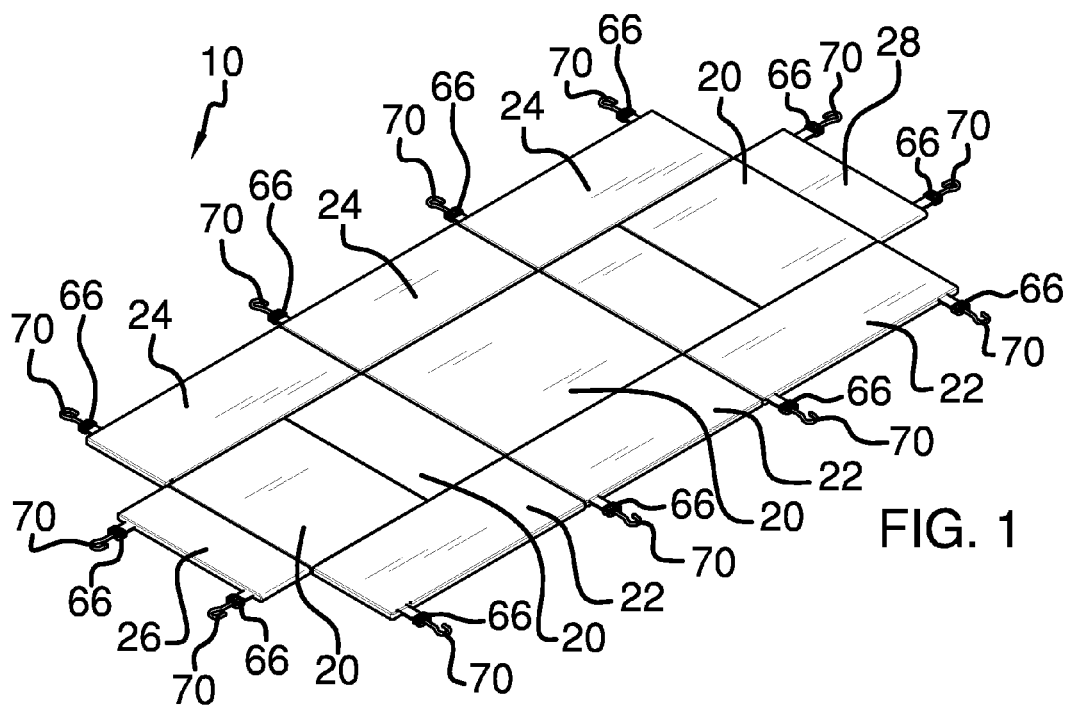

Large hailstones can reach extreme velocities and transmit and deliver destructive energy to vehicles. Even small hailstones can cause serious and permanent damage to car and truck metal panels and glass surfaces. Various types of protective vehicle covers are known in the prior art. However, there is a need in the art for impact resistant cover for a vehicle which is modular to fit most vehicles, which is resilient enough to resist large hailstones, which is easy to assemble and secure to the vehicle and easy to disassemble and store.

FIELD OF THE INVENTION

The present invention relates to a cover for protecting vehicles or from foreign objects, and more particularly, to a cover for protecting a vehicle from hail, which includes a set of top pads, a set of left pads, a set of right pads, a front pad and a rear pad. The pads removably attach to each other by hook and loop fasteners to form the cover. The left, right, front, and rear pads each include a strap and a hook to secure the cover to the car. Each pad includes a waterproof outer layer, an impact resistant middle layer and a soft bottom layer. The impact resistant cover for a vehicle is modular so that any number of top and side pads may be used to accommodate vehicles of different sizes and shapes. The impact resistant cover for a vehicle is easy to assemble and secure to the vehicle and is easy to disassemble and store.

SUMMARY OF THE INVENTION

The general purpose of the present impact resistant cover for a vehicle, described subsequently in greater detail, is to provide an impact resistant cover for a vehicle which has many novel features that result in an impact resistant cover for a vehicle which is not anticipated, rendered obvious, suggested, or even implied by prior art, either alone or in combination thereof.

To accomplish this, the present impact resistant cover for a vehicle includes which includes a set of top pads, a set of left pads, a set of right pads, a front pad and a rear pad. Each pad includes a waterproof outer layer, an impact resistant middle layer, and a soft bottom layer. A hook and loop fastener, such as Velcro®, is disposed on each pad. The waterproof outer layer keeps the vehicle dry. The impact resistant middle layer can be composed of a 1-inch thick extruded polystyrene foam, such as Styrofoam, a 1-inch thick 1-inch thick corrugated fiberboard, and alternately air bubble plastic material, such as Bubble Wrap™. The impact resistant middle layer absorbs the force delivered by hail and other flying debris to prevent damage to the vehicle. The soft bottom layer prevents damage to a surface of the vehicle by the cover. Each left, right, front and rear pad also includes at least one elastomeric strap with a hook connected to each elastomeric strap.

The impact resistant cover for a vehicle also includes an inflatable middle layer in each of the top pads, left pads, right pads, front and rear pads. The inflatable middle layer includes an inflatable rubber bladder and a valve. A hose is included with the impact resistant cover for a vehicle. Each top pad, left pad, right pad, front pad, and rear pad may be inflated by using the hose to connect the valve to an air supply source.

The pads removably attach to each other by securing the hook and loop fabric fasteners, to form the cover. Each hook attaches to a frame of the vehicle to secure the cover to the vehicle. The impact resistant cover for a vehicle is modular so that any number of pads may be used to accommodate vehicles of different sizes and shapes. The removable attachment of the pads to each other permits the cover to be easily assembled and secured to the vehicle, and conversely, to be easily disassembled for transport and storage.

Thus has been broadly outlined the more important features of the present impact resistant cover for a vehicle so that the detailed description thereof that follows may be better understood and in order that the present contribution to the art may be better appreciated.

BRIEF DESCRIPTION OF THE DRAWINGS FIGURES

Figure 2:
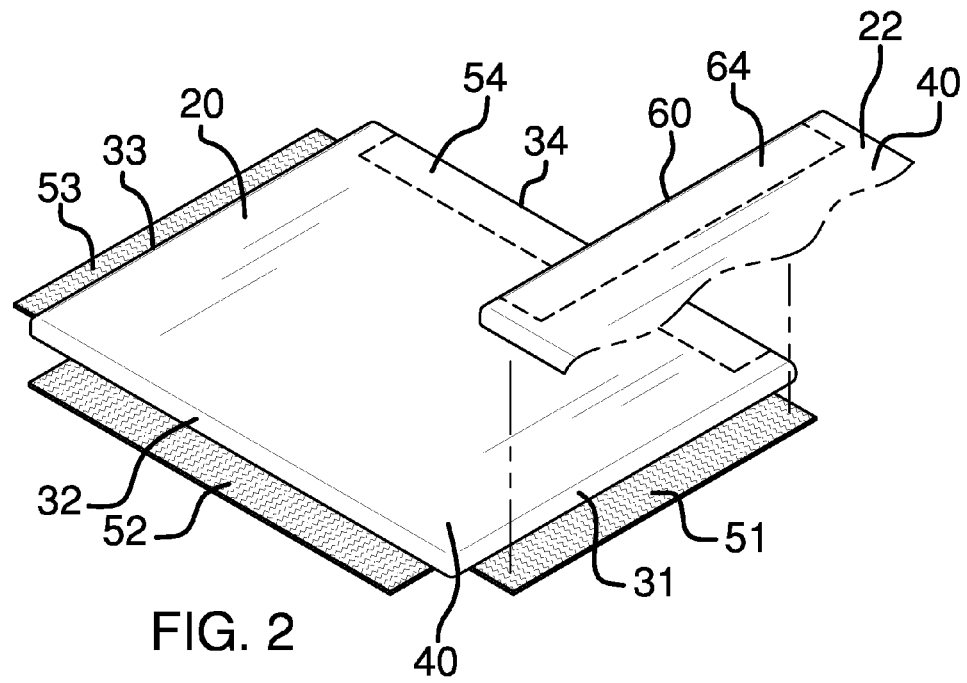
Figure 3:
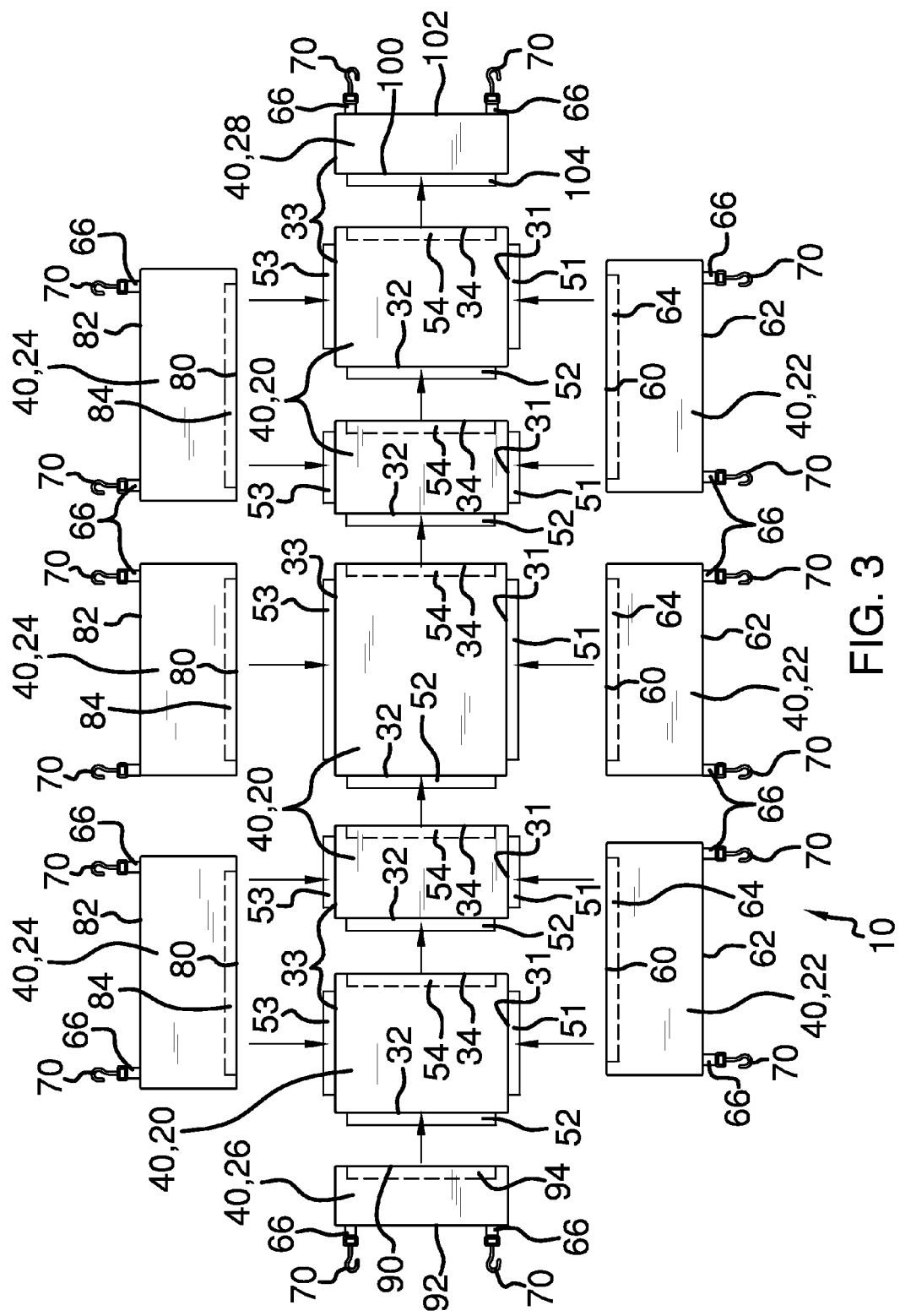
Figure 4:
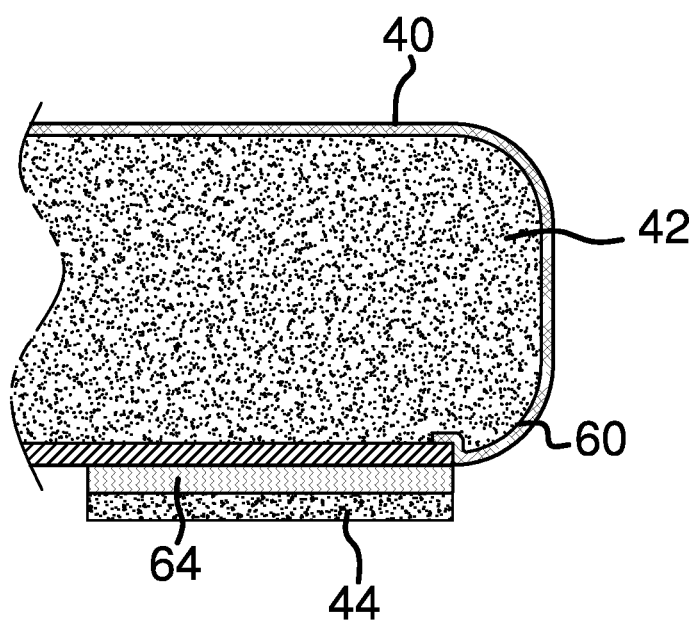
Figure 5:
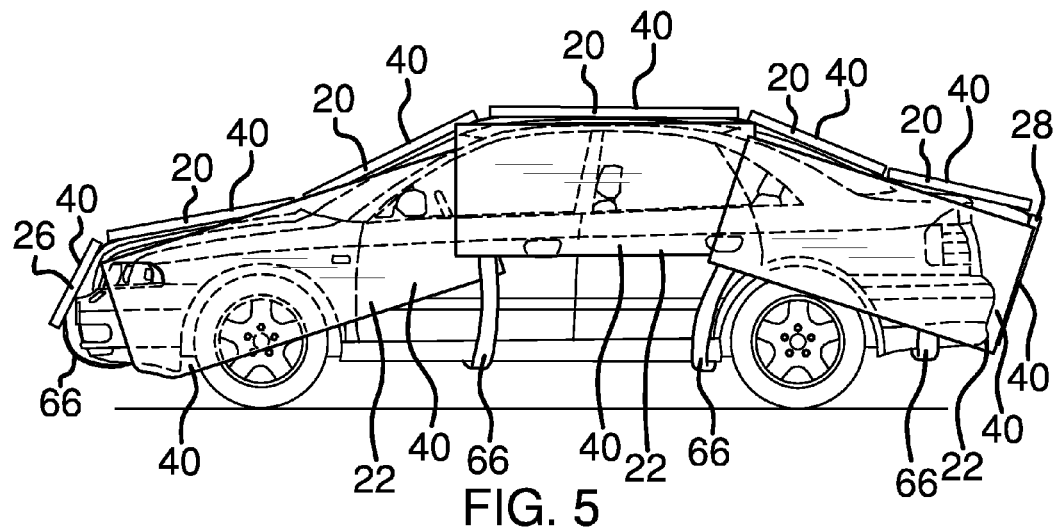
Figure 6:
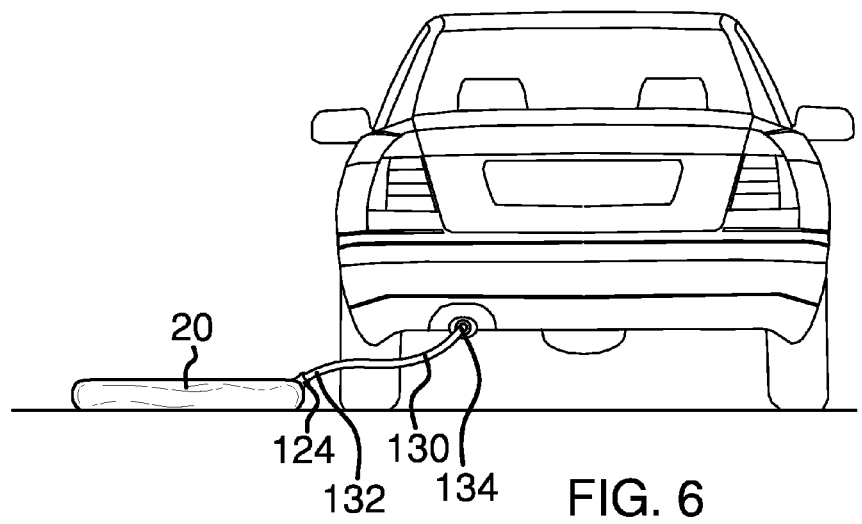

FIG. 1 is an isometric view.
FIG. 2 is an isometric view of a top pad and a left side pad shown in fragmentary form.
FIG. 3 is an exploded top plan view.
FIG. 4 is a cross-sectional view taken along line 4-4 of FIG. 3.
FIG. 5 is an in-use side elevation view.
FIG. 6 is an in-use view showing the top pad and a hose in operational communication therewith.

DETAILED DESCRIPTION OF THE DRAWINGS

With reference now to the drawings, and in particular FIGS. 1 through 6 thereof, an example of the instant impact resistant cover for a vehicle employing the principles and concepts of the present impact resistant cover for a vehicle and generally designated by the reference number 10 will be described.

Referring to FIGS. 1 through 6 the present impact resistant cover for a vehicle 10 is illustrated. The impact resistant cover for a vehicle 10 includes a set of top pads 20, a set of left pads 22, a set of right pads 24, a front pad 26, and a rear pad 28. Each top pad 20 has a rectangular shape with a first side 31, a second side 32, a third side 33, and a fourth side 34. Each top pad 20 comprises a waterproof outer layer 40, an impact resistant middle layer 42, and a soft bottom layer 44. The impact resistant middle layer 42 is composed of an impact resistant material 43. The impact resistant middle layer 42 absorbs the force delivered by hail to prevent damage to the vehicle. The impact resistant middle layer 42 can be composed of a 1-inch thick extruded polystyrene foam, such as Styrofoam, 1-inch thick corrugated fiberboard, and alternately air bubble plastic material, such as Bubble Wrap®. The soft bottom layer 44 prevents damage to the vehicle's surface by the cover 10.

A first strip of hook fabric 51 is disposed parallel to and protruding from the first side 31. A second strip of hook fabric 52 is disposed parallel to and protruding from the second side 32. A third strip of hook fabric 53 is disposed parallel to and protruding from the third side 33. A strip of loop fabric 54 is disposed on the soft bottom layer 44, parallel to and adjacent to the fourth side 34.

Each left pad 22 has a rectangular shape with a left attachment side 60 and a left strap side 62. Each left pad 22 comprises the waterproof outer layer 40, the impact resistant middle layer 42, and the soft bottom layer 44. A left band of loop fabric 64 is disposed on the soft bottom layer 44, parallel to and adjacent to the left attachment side 60. At least one elastomeric strap 66 is disposed on the left strap side 62. Each elastomeric strap 66 has a first end 68 and a second end 69. The first end 68 connects to the left strap side 62. A hook 70 is disposed on the second end 69 of each of the elastomeric straps 66.

Each right pad 24 has a rectangular shape with a right attachment side 80 and a right strap side 82. Each right pad 24 includes the waterproof outer layer 40, the impact resistant middle layer 42, and the soft bottom layer 44. A right band of loop fabric 84 is disposed on the soft bottom layer 44, parallel to and adjacent to the right attachment side 80. At least one of the elastomeric straps 66 with a hook 70 is disposed on the right strap side 82.

The front pad 26 has a rectangular shape with a front attachment side 90 and a front strap side 92. The front pad 26 includes the waterproof outer layer 40, the impact resistant middle layer 42 and the soft bottom layer 44. A front band of loop fabric 94 is disposed on the soft bottom layer 44, parallel to and adjacent to the front attachment side 90. At least one of the elastomeric straps 66 with a hook 70 is disposed on the front strap side 92.

The rear pad 28 has a rectangular shape with a rear attachment side 100 and a rear strap side 102. The rear pad 28 includes the waterproof outer layer 40, the impact resistant middle layer 42 and the soft bottom layer 44. A rear band of hook fabric 104 is disposed on the soft bottom layer 44, parallel to and adjacent to the rear attachment side 100. At least one of the elastomeric straps 66 with a hook 70 is disposed on the rear strap side 102.

Each of the top pads 20 removably attaches to at least one of another top pad 20 by attaching the strip of loop fabric 54 to the second strip of hook fabric 52. Each of the left pads 22 removably attaches to one of the top pads 20 by attaching the left band of loop fabric 64 to the first strip of hook fabric 51. Each of the right pads 24 removably attaches to one of the top pads 22 by attaching the right band of loop fabric 84 to the third strip of hook fabric 53. The front pad 26 removably attaches to one of the top pads 20 by attaching the front band of loop fabric 94 to the second strip of hook fabric 52. The rear pad 28 removably attaches to one the top pads 20 by attaching the rear band of hook fabric 104 to the strip of loop fabric 54 that is not already attached.

The attachment of each of the top pads 20 to one of another top pad 20 and attachment of each of the left pads 22, right pad 24, front pad 26 and rear pad 28 to the top pads 20 forms the cover to protect the vehicle from hail 10. The hook 70 of each left pad 22, right pad 24, front pad 26 and rear pad 28 removably attaches to a frame of the vehicle to secure the cover 10 to the vehicle.

The impact resistant cover for a vehicle 10 also includes an inflatable middle layer 120 in each of the top pads 20, left pads 22, right pads 24, front pad 26 and rear pad 28. The inflatable middle layer 120 includes an inflatable rubber bladder 122 and a valve 124. A hose 130 is included with the impact resistant cover for a vehicle 10. The hose 130 has a first hose end 132 and a second hose end 134. The first hose end 132 connects to the valve 124 of the inflatable middle layer 120. The second hose end 134 connects to an air supply source, such as a compressor, an air pump or car exhaust pipe. Each top pad 20, left pad 22, right pad 24, front pad 26, and rear pad 28 may be inflated by connecting the first hose end 132 to the valve 124 and the second hose end 134 to the air supply source.

The impact resistant cover for a vehicle 10 is modular so that any number of top pads 20, left and right side pads 22, 24 may be used to accommodate vehicles of different sizes and shapes. The present impact resistant cover for a vehicle 10 is easy to assemble and secure to the vehicle and is easy to disassemble and store.

What is claimed is:

1. An impact resistant cover for a vehicle, the cover comprising:
   a set of top pads, each top pad having a rectangular shape with a first side, a second side, a third side, and a fourth side, each top pad comprising:
     a waterproof outer layer;
     an impact resistant middle layer, the impact resistant middle layer comprising an impact resistant material, the impact resistant middle layer being configured to absorb the force delivered by hail to prevent damage to the vehicle;
     a soft bottom layer, the bottom layer being configured to prevent damage to a surface of the vehicle by the cover;
     a fastener;
   a set of left pads; each left pad having a rectangular shape with a left attachment side and a left strap side, each left pad comprising:
     the waterproof outer layer;
     the impact resistant middle layer;
     the soft bottom layer;
     a fastener;
     at least one elastomeric strap, each elastomeric strap having a first end and a second end, the first end connected to the left strap side; and
     a hook disposed on the second end of each of the elastomeric straps;
   a set of right pads; each right pad having a rectangular shape with a right attachment side and a right strap side, each right pad comprising:
     the waterproof outer layer;
     the impact resistant middle layer;
     the soft bottom layer;
     a fastener;
     at least one of the elastomeric straps, the first end connected to the right strap side;
     the hook disposed on the second end of each of the elastomeric straps;
   a front pad, the front pad having a rectangular shape with a front attachment side and a front strap side, each front pad comprising:
     the waterproof outer layer;
     the impact resistant middle layer;
     the soft bottom layer;
     a fastener;
     at least one of the elastomeric straps, the first end connected to the front strap side;
     the hook disposed on the second end of each of the elastomeric straps;
   a rear pad, the rear pad having a rectangular shape with a rear attachment side and a rear strap side, each rear pad comprising:
     the waterproof outer layer;
     the impact resistant middle layer;
     the soft bottom layer;
     a fastener;
     at least one of the elastomeric straps, the first end connected to the rear strap side; and
     the hook disposed on the second end of each of the elastomeric straps;
   wherein the fasteners removably attach the pads to each other to form the impact resistant cover for a vehicle;

wherein the hook of each left, right, front and rear pad is configured to removably attach to a frame of the vehicle to secure the cover to the vehicle.

2. The impact resistant cover for a vehicle of claim 1 wherein the fastener comprises:
a first strip of hook fabric disposed parallel to and protruding from the first side;
a second strip of hook fabric disposed parallel to and protruding from the second side;
a third strip of hook fabric disposed parallel to and protruding from the third side;
a strip of loop fabric disposed on the soft bottom layer, parallel to and adjacent to the fourth side;
a left band of loop fabric disposed on the soft bottom layer, parallel to and adjacent to the left attachment side;
a right band of loop fabric disposed on the soft bottom layer, parallel to and adjacent to the right attachment side;
a front band of loop fabric disposed on the soft bottom layer, parallel to and adjacent to the front attachment side; and
a rear band of hook fabric disposed on the soft bottom layer, parallel to and adjacent to the front attachment side;
wherein each of the top pads is configured to removably attach to at least one of another top pad by attaching the strip of loop fabric to the second strip of hook fabric;
wherein each of the left pads is configured to removably attach to one of a top pad by attaching the left band of loop fabric to the first strip of hook fabric;
wherein each of the right pads is configured to removably attach to one of a top pad by attaching the right band of loop fabric to the third strip of hook fabric;
wherein the front pad is configured to removably attach to one of a top pad by attaching the front band of loop fabric to the second strip of hook fabric;
wherein the rear pad is configured to removably attach to one a top pad by attaching the rear band of hook fabric to the strip of loop fabric;
wherein upon attachment of each of the top pads to one of another top pad and attaching each of the left, right, front and rear pad to the top pads, the pads form the impact resistant cover for a vehicle;
wherein the hook of each left, right, front and rear pad is configured to removably attach to a frame of the vehicle to secure the cover to the vehicle.

3. The impact resistant cover for a vehicle of claim 1, wherein the impact resistant middle layer of each of the top pads and each of the side pads are formed of 1-inch thick extruded polystyrene foam.

4. The impact resistant cover for a vehicle of claim 1, wherein the middle layer of each of the top pads and each of the side pads is formed of 1-inch thick corrugated fiberboard.

5. The impact resistant cover for a vehicle of claim 1, wherein the middle layer of each of the top pads and each of the side pads is formed of air bubble plastic material.

6. An impact resistant cover for a vehicle, the cover comprising:
a set of top pads, each top pad having a rectangular shape with a first side, a second side, a third side, and a fourth side, each top pad comprising:
a waterproof outer layer;
an inflatable middle layer, the inflatable middle layer comprising an inflatable rubber bladder and a valve, the middle layer configured to absorb the force delivered by hail to prevent damage to the vehicle;
a soft bottom layer, the bottom layer being configured to prevent damage to a surface of the vehicle by the cover;
a first strip of hook fabric disposed parallel to and protruding from the first side;
a second strip of hook fabric disposed parallel to and protruding from the second side;
a third strip of hook fabric disposed parallel to and protruding from the third side;
a strip of loop fabric disposed on the soft bottom layer, parallel to and adjacent to the fourth side;
a set of left pads; each left pad having a rectangular shape with an left attachment side and a left strap side, each left pad comprising:
the waterproof outer layer;
the inflatable middle layer;
the soft bottom layer;
a left band of loop fabric disposed on the soft bottom layer, parallel to and adjacent to the left attachment side;
at least one elastomeric strap, each elastomeric strap having a first end and a second end, the first end connected to the left strap side; and
a hook disposed on the second end of each of the elastomeric straps;
a set of right pads; each right pad having a rectangular shape with a right attachment side and a right strap side, each right pad comprising:
the waterproof outer layer;
the inflatable middle layer;
the soft bottom layer;
a right band of loop fabric disposed on the soft bottom layer, parallel to and adjacent to the right attachment side;
at least one of the elastomeric straps, each elastomeric strap having a first end and a second end, the first end connected to the right strap side; and
the hook disposed on the second end of each of the elastomeric straps;
a front pad, the front pad having a rectangular shape with a front attachment side and a front strap side, each front pad comprising:
the waterproof outer layer;
the inflatable middle layer;
the soft bottom layer;
a front band of loop fabric disposed on the soft bottom layer, parallel to and adjacent to the front attachment side;
at least one of the elastomeric straps;
the hook disposed on the second end of each of the elastomeric straps;
a rear pad, the rear pad having a rectangular shape with a rear attachment side and a rear strap side, each rear pad comprising:
the waterproof outer layer;
the inflatable middle layer;
the soft bottom layer;
a rear band of hook fabric disposed on the soft bottom layer, parallel to and adjacent to the front attachment side;
at least one of the elastomeric straps, each elastomeric strap having a first end and a second end, the first end connected to the rear strap side; and
the hook disposed on the second end of each of the elastomeric straps;

a hose having a first hose end and a second hose end. The first hose end being configured to connect to the valve of the inflatable middle layer. The second hose end being configured to connect to an air supply source;

wherein inflatable bladder is configured to inflate upon connection of the hose to the air supply source on the second hose end and to the valve of each of the top pads and each of the side pads on the first hose end;

wherein each of the top pads is configured to removably attach to at least one of another top pad by attaching the strip of loop fabric to the second strip of hook fabric;

wherein each of the left pads is configured to removably attach to one of a top pad by attaching the left band of loop fabric to the first strip of hook fabric;

wherein each of the right pads is configured to removably attach to one of a top pad by attaching the right band of loop fabric to the third strip of hook fabric;

wherein the front pad is configured to removably attach to one of a top pad by attaching the front band of loop fabric to the second strip of hook fabric;

wherein the rear pad is configured to removably attach to one a top pad by attaching the rear band of hook fabric to the strip of loop fabric;

wherein upon attachment of each of the top pads to one of another top pad and attaching each of the left, right, front and rear pad to the top pads, the pads form the cover to protect the vehicle from hail;

wherein the hook of each left, right, front and rear pad is configured to removably attach to a frame of the vehicle to secure the cover to the vehicle.

* * * * *